US012676702B2

(12) United States Patent
Hu et al.

(10) Patent No.: US 12,676,702 B2
(45) Date of Patent: Jul. 7, 2026

(54) METHOD AND DEVICE IN NODES USED FOR TRANSMITTING FEEDBACK BITS FOR MULTIPLE RESOURCE POOLS

(71) Applicant: Apogee 5G Global, LLC, Plano, TX (US)

(72) Inventors: Yang Hu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 342 days.

(21) Appl. No.: 18/111,608

(22) Filed: Feb. 20, 2023

(65) Prior Publication Data

US 2023/0208567 A1 Jun. 29, 2023

Related U.S. Application Data

(63) Continuation of application No. PCT/CN2022/127641, filed on Oct. 26, 2022.

(30) Foreign Application Priority Data

Oct. 27, 2021 (CN) .......................... 202111253404.8

(51) Int. Cl.
*H04L 1/1829* (2023.01)
(52) U.S. Cl.
CPC .................................. *H04L 1/1861* (2013.01)
(58) Field of Classification Search
CPC ... H04L 1/1861; H04L 5/0055; H04L 1/1822; H04L 1/1893; H04L 1/1896; H04L 1/16;
(Continued)

(56) References Cited

U.S. PATENT DOCUMENTS

| 10,064,206 B2 | 8/2018 | Seo |
| 11,160,053 B2 | 10/2021 | Kim |

(Continued)

FOREIGN PATENT DOCUMENTS

WO 2020078272 A1 4/2020

OTHER PUBLICATIONS

OPPO, "Summary#3 on UCI enhancements for URLLC ," 3GPP TSG RAN WG1 #99, R1-1913535, Reno, USA (Nov. 18-22, 2019).
(Continued)

*Primary Examiner* — Edan Orgad
*Assistant Examiner* — Samuel Roberge Bettendorf
(74) *Attorney, Agent, or Firm* — Volpe Koenig

(57) ABSTRACT

Method and device in a node for wireless communications. A first receiver receives first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type among the N resource pools is a first number, the first number being a positive integer; when the first number is less than N, receives a bit block in each resource pool of the second type among the N resource pools; a first transmitter transmits a target bit, a value of the target bit is equal to a target binary value acquired after logical.

20 Claims, 4 Drawing Sheets

100

First node

Receiving first information ⌐101

Receiving first signaling ⌐102

Receiving a bit block in each resource pool of second type among N resource pools ⌐103

Transmitting target bit 104

(58) Field of Classification Search

CPC ..... H04W 28/02; H04W 72/04; H04W 72/12; H04W 28/0231

See application file for complete search history.

(56) References Cited

U.S. PATENT DOCUMENTS

| | | | | |
|---|---|---|---|---|
| 11,923,984 | B2 | 3/2024 | Wu et al. | |
| 12,192,966 | B2 | 1/2025 | Jiang et al. | |
| 2020/0337030 | A1* | 10/2020 | Zhang | H04L 1/1896 |
| 2020/0413425 | A1* | 12/2020 | Lin | H04L 1/1864 |
| 2021/0288778 | A1 | 9/2021 | Park | |
| 2022/0225400 | A1* | 7/2022 | Wong | H04W 72/0446 |
| 2022/0272671 | A1 | 8/2022 | Wu et al. | |

OTHER PUBLICATIONS

Third Generation Partnership Project, "Technical Specification Group Radio Access Network; NR; Multiplexing and channel coding (Release 16)," 3GPP TS 38.212 V16.7.0 (Sep. 2021).

Third Generation Partnership Project, "Technical Specification Group Radio Access Network; NR; Physical layer procedures for control (Release 16)," 3GPP TS 38.213 V16.7.0 (Sep. 2021).

Third Generation Partnership Project, "Technical Specification Group Radio Access Network; NR; Physical layer procedures for data (Release 16)," 3GPP TS 38.214 V16.7.0 (Sep. 2021).

* cited by examiner

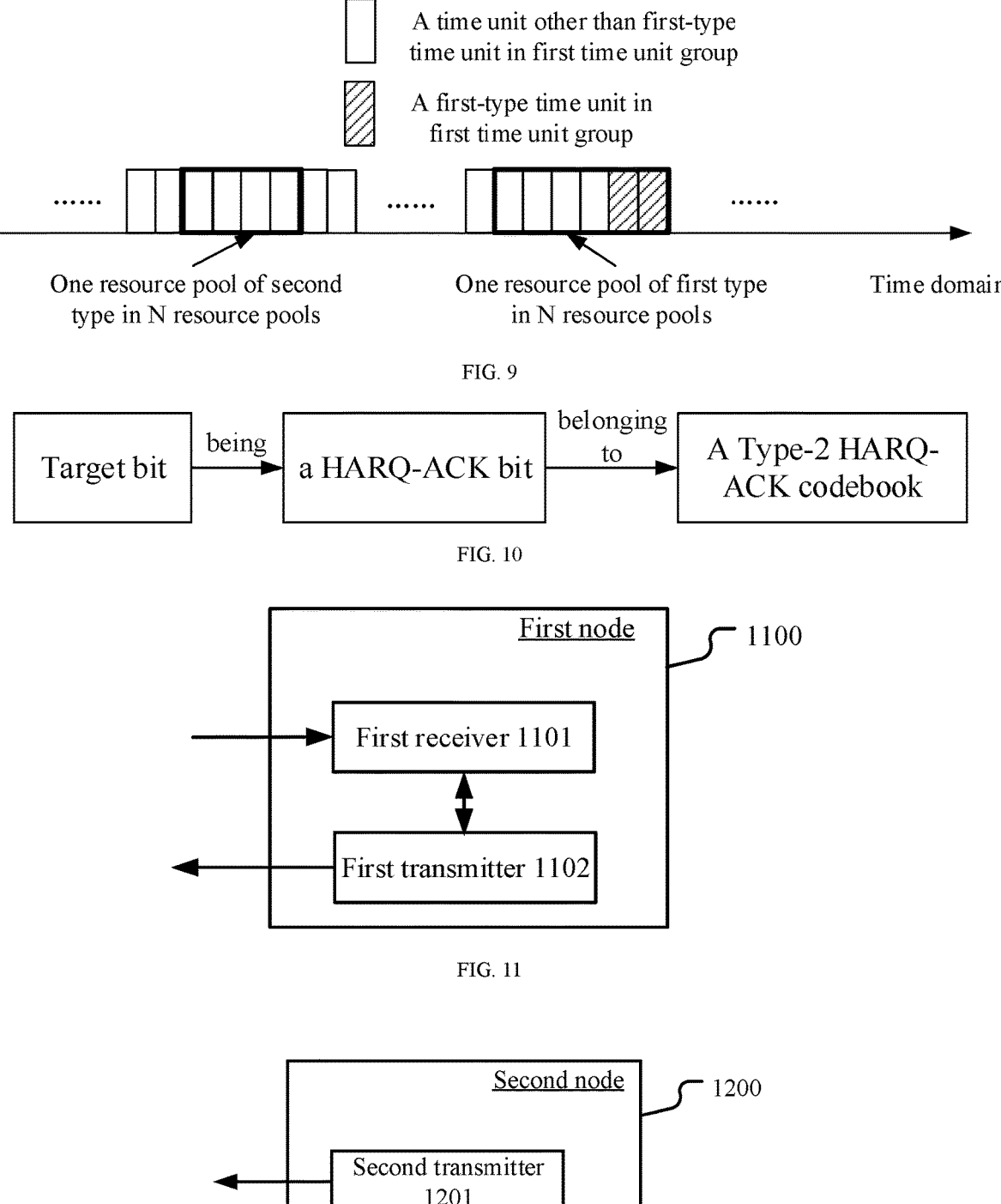

□ A time unit other than first-type time unit in first time unit group

▨ A first-type time unit in first time unit group

One resource pool of second type in N resource pools

One resource pool of first type in N resource pools

Time domain

FIG. 9

| Target bit | → being → | a HARQ-ACK bit | → belonging to → | A Type-2 HARQ-ACK codebook |

FIG. 10

First node                                              1100

First receiver 1101

⇕

First transmitter 1102

FIG. 11

Second node                                              1200

Second transmitter 1201

⇕

Second receiver 1202

FIG. 12

METHOD AND DEVICE IN NODES USED FOR TRANSMITTING FEEDBACK BITS FOR MULTIPLE RESOURCE POOLS

CROSS REFERENCE TO RELATED APPLICATIONS

This application is the continuation of the international patent application No. PCT/CN2022/127641, filed on Oct. 26, 2022, which claims the priority benefit of Chinese Patent Application No. 202111253404.8, filed on Oct. 27, 2021, the full disclosure of which is incorporated herein by reference.

BACKGROUND

Technical Field

The present application relates to transmission methods and devices in wireless communication systems, and in particular to a transmission method and device of a radio signal in a wireless communication system supporting cellular networks.

Related Art

For wireless communications using a high frequency band (such as a frequency band between 52.6 GHz and 71 GHz), the scheduling method of one DCI format scheduling multiple PDSCHs/PUSCHs is introduced by 3GPP in NR Release 17.

SUMMARY

To reduce the Hybrid Automatic Repeat reQuest ACKnowledgement (HARQ-ACK) feedback overhead, the method of time-domain bundling can be used to feedback only one (or two) HARQ-ACK bit for multiple PDSCHs scheduled by one DCI format; when resources reserved for some PDSCHs are unavailable, how to determine a feedback bit after time-domain bundling is a key problem to be solved.

To address the above problem, the present application provides a solution. It should be noted that in the description of the application, using one DCI format to schedule multiple PDSCHs in a high frequency band is used as a typical application scenario or example; the application is also applicable to other scenarios, such as multi-transmission/reception node transmission, Internet of Things (IoT), Ultra Reliable Low Latency Communication (URLLC) network, Internet of Vehicles, etc., where similar technical effects can be achieved. In addition, the adoption of a unified solution in different scenarios (including but not limited to high frequency band communications, multi-transmission/reception node transmission, IoT, URLLC network, Internet of Vehicles (IoV), NTN) also helps to reduce hardware complexity and cost or improve performance. If no conflict is incurred, embodiments in any node in the present application and the characteristics of the embodiments are also applicable to any other node, and vice versa. And the embodiments in the present application and the characteristics in the embodiments can be arbitrarily combined if there is no conflict.

In one embodiment, interpretations of the terminology in the present application refer to definitions given in the 3GPP TS36 series.

In one embodiment, interpretations of the terminology in the present application refer to definitions given in the 3GPP TS38 series.

In one embodiment, interpretations of the terminology in the present application refer to definitions given in the 3GPP TS37 series.

In one embodiment, interpretations of the terminology in the present application refer to definitions given in Institute of Electrical and Electronics Engineers (IEEE) protocol specifications.

The present application provides a method in a first node for wireless communications, comprising:

receiving first information and a first signaling, the first signaling being used to indicate N resource pools, N being a positive integer greater than 1, the first information being used to determine a type of at least one of the N resource pools, the type of any of the N resource pools being one of a first type and a second type, a number of resource pool(s) of the first type among the N resource pools being a first number, the first number being a positive integer; when the first number is less than N, receiving a bit block in each resource pool of the second type among the N resource pools; and transmitting a target bit, a value of the target bit being equal to a target binary value acquired after logical And operation of N binary values;

herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one embodiment, a problem to be solved in the present application includes: how to determine a role of each resource pool in generating a HARQ-ACK bit for time-domain bundling operation according to a type of a scheduled resource pool.

In one embodiment, a problem to be solved in the present application includes determining how a target bit is generated according to a number of resource pool(s) of the first type (or the second type) in the N resource pools.

In one embodiment, characteristics of the above method include: the value of the target bit depends on the first number.

In one embodiment, characteristics of the above method include: a determination method of the value of the target bit depends on the first number.

In one embodiment, advantages of the above method include avoiding using an improper bit value 0 (corresponding to NACK) to perform logical And operation to generate invalid HARQ-ACK messages.

In one embodiment, advantages of the above method include: it is conducive to be compatible with the scheme of a feedback of NACK for PDSCH colliding with a semi-static UL symbol, which has been approved by 3GPP.

In one embodiment, advantages of the above method include small workload required for standard revision.

In one embodiment, advantages of the above method include high efficiency of HARQ-ACK feedback.

According to one aspect of the present application, the above method is characterized in that a given binary value is one of the N binary values, and the given binary value corresponds to a resource pool of the first type among the N resource pools: when the first number is equal to N, the given binary value is equal to 0; and when the first number is less than N, the given binary value is equal to 1.

In one embodiment, characteristics of the above method include: whether a binary value corresponding to a resource pool of the first type among the N resource pools is 0 (representing NACK) or 1 (representing ACK) is determined according to the first number.

According to one aspect of the present application, the above method is characterized in comprising:

transmitting M bit(s), the target bit being one of the M bit(s);

herein, the first signaling is used to indicate M0 resource pool groups, any of the M0 resource pool groups comprises at least one resource pool, and the N resource pools belong a same resource pool group among the M0 resource pool groups; the M bit(s) corresponds (respectively correspond) to M resource pool group(s) among the M0 resource pool groups; M0 is a positive integer greater than 1, and M is a positive integer not greater than the M0.

In one embodiment, characteristics of the above method include: multiple PDSCHs scheduled by one DCI format are divided into multiple PDSCH groups, time-domain bundling operation is performed respectively in each of the multiple PDSCH groups, and at most one HARQ-ACK bit is fed back for each of the multiple PDSCH groups.

According to one aspect of the present application, the above method is characterized in that there exists one of the M0 resource pool groups comprising at least one resource pool of the second type; only when at least P resource pool groups in the M0 resource pool groups respectively comprise at least one resource pool of the second type or the first number is less than N, the target bit is transmitted; P is a positive integer greater than 1 and not greater than M0, P is a default or configurable value.

In one embodiment, characteristics of the above method include: when at most P valid resource pool groups (that is, comprising at least one resource pool of the second type) are comprised in the M0 resource pool groups, a HARQ-ACK codebook is compressed before reported.

In one embodiment, advantages of the above method include: it is conducive to further reduce the overhead of HARQ-ACK feedback.

According to one aspect of the present application, the above method is characterized in that a first time unit group comprises multiple time units, and each of the N resource pools comprises at least one time unit belonging to the first time unit group in time domain; the first information is used to determine a first-type time unit in the first time unit group, and a resource pool of the first type among the N resource pools is a resource pool comprising at least one first-type time unit belonging to the first time unit group.

According to one aspect of the present application, the above method is characterized in that there is no time-domain overlapping among the N resource pools.

According to one aspect of the present application, the above method is characterized in that the target bit is a HARQ-ACK bit, and the target bit belongs to a Type-2 HARQ-ACK codebook.

The present application provides a method in a second node for wireless communications, comprising:

transmitting first information and a first signaling, the first signaling being used to indicate N resource pools, N being a positive integer greater than 1, the first information being used to determine a type of at least one of the N resource pools, the type of any of the N resource pools being one of a first type and a second type, a number of resource pool(s) of the first type among the N resource pools being a first number, the first number being a positive integer; when the first number is less than N, transmitting a bit block in each resource pool of the second type among the N resource pools; and receiving a target bit, a value of the target bit being equal to a target binary value acquired after logical And operation of N binary values;

herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

According to one aspect of the present application, the above method is characterized in that a given binary value is one of the N binary values, and the given binary value corresponds to a resource pool of the first type among the N resource pools: when the first number is equal to N, the given binary value is equal to 0; and when the first number is less than N, the given binary value is equal to 1.

According to one aspect of the present application, the above method is characterized in comprising:

receiving M bit(s), the target bit being one of the M bit(s);

herein, the first signaling is used to indicate M0 resource pool groups, any of the M0 resource pool groups comprises at least one resource pool, and the N resource pools belong a same resource pool group among the M0 resource pool groups; the M bit(s) corresponds (respectively correspond) to M resource pool group(s) among the M0 resource pool groups; M0 is a positive integer greater than 1, and M is a positive integer not greater than the M0.

According to one aspect of the present application, the above method is characterized in that there exists one of the M0 resource pool groups comprising at least one resource pool of the second type; only when at least P resource pool groups in the M0 resource pool groups respectively comprise at least one resource pool of the second type or the first number is less than N, the target bit is transmitted; P is a positive integer greater than 1 and not greater than M0, P is a default or configurable value.

According to one aspect of the present application, the above method is characterized in that a first time unit group comprises multiple time units, and each of the N resource pools comprises at least one time unit belonging to the first time unit group in time domain; the first information is used to determine a first-type time unit in the first time unit group, and a resource pool of the first type among the N resource pools is a resource pool comprising at least one first-type time unit belonging to the first time unit group.

According to one aspect of the present application, the above method is characterized in that there is no time-domain overlapping among the N resource pools.

According to one aspect of the present application, the above method is characterized in that the target bit is a HARQ-ACK bit, and the target bit belongs to a Type-2 HARQ-ACK codebook.

The present application provides a first node for wireless communications, comprising:

a first receiver, receiving first information and a first signaling, the first signaling being used to indicate N resource pools, N being a positive integer greater than 1, the first information being used to determine a type of at least one of the N resource pools, the type of any of the N resource pools being one of a first type and a second type, a number of resource pool(s) of the first type among the N resource pools being a first number, the first number being a positive integer; when the first number is less than N, receiving a bit block in each resource pool of the second type among the N resource pools; and a first transmitter, transmitting a target bit, a value of the target bit being equal to a target binary value acquired after logical And operation of N binary values;

herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

The present application provides a second node for wireless communications, comprising:

a second transmitter, transmitting first information and a first signaling, the first signaling being used to indicate N resource pools, N being a positive integer greater than 1, the first information being used to determine a type of at least one of the N resource pools, the type of any of the N resource pools being one of a first type and a second type, a number of resource pool(s) of the first type among the N resource pools being a first number, the first number being a positive integer; when the first number is less than N, transmitting a bit block in each resource pool of the second type among the N resource pools; and a second receiver, receiving a target bit, a value of the target bit being equal to a target binary value acquired after logical And operation of N binary values;

herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one embodiment, the method in the present application is advantageous in the following aspects:

generation of invalid HARQ-ACK information is avoided;

it is compatible with the existing progress of 3GPP;

small workload is required for standard revision;

the efficiency of HARQ-ACK feedback is high;

it is conducive to reducing the overhead of HARQ-ACK feedback.

BRIEF DESCRIPTION OF THE DRAWINGS

Other features, objects and advantages of the present application will become more apparent from the detailed description of non-restrictive embodiments taken in conjunction with the following drawings:

FIG. 9 illustrates an illustration schematic diagram of a type of a resource pool according to one embodiment of the present application;

FIG. 10 illustrates an illustration schematic diagram of a target bit according to one embodiment of the present application;

FIG. 11 illustrates a structure block diagram of a processor in a first node according to one embodiment of the present application;

FIG. 12 illustrates a structure block diagram of a processor in second node according to one embodiment of the present application.

DESCRIPTION OF THE EMBODIMENTS

The technical solution of the present application will be further described in detail below in combination with the drawings. It should be noted that, in the case of no conflict, the embodiments of the present application and the features in the embodiments may be combined with each other arbitrarily.

Embodiment 1

Figure 1:
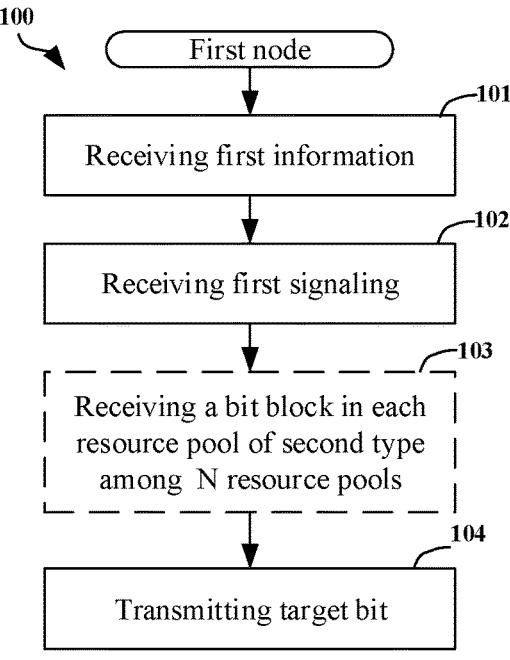
FIG. 1 illustrates a flowchart of the processing of a first node according to one embodiment of the present application.

Embodiment 1 illustrates a flowchart of processing of a first node according to one embodiment of the present application, as shown in FIG. 1. In FIG. 1, the step 103 in the dotted block is optional.

In Embodiment 1, the first node in the present application receives first information in step 101; receives a first signaling in step 102; receives a bit block in each resource pool with a type of a second type in N resource pools in step 103; and transmits a target bit in step 103.

In Embodiment 1, the first signaling is used to indicate N resource pools, N is a positive integer greater than 1, the first information is used to determine a type of at least one of the N resource pools, the type of any of the N resource pools is one of a first type and a second type, a number of resource pool(s) of the first type in the N resource pools is a first number, the first number is a positive integer; when the first number is less than N, the first node receives a bit block in each resource pool of the second type in the N resource pools; a value of the target bit is equal to a target binary value acquired after logical And operation of N binary values; for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one embodiment, when the first number is less than N: the first node first receives a bit block in each resource pool of the second type among the N resource pools, then transmits the target bit.

In one embodiment, only when the first number is less than N: the first node receives a bit block in each resource pool of the second type in the N resource pools.

In one embodiment, when the first number is less than N: the step 103 exists.

In one embodiment, when the first number is equal to N: the step 103 does not exist.

In one embodiment, when the first number is less than N: a time when the first node starts receiving a bit block in a resource pool of the second type in the N resource pools is earlier than a time when the first node starts receiving the first signaling.

In one embodiment, when the first number is less than N: a time when the first node starts receiving a bit block in a resource pool of the second type in the N resource pools is not earlier than a time when the first node starts receiving the first signaling.

In one embodiment, the first information is a higher-layer signaling.

In one embodiment, the first information is an RRC signaling.

In one embodiment, the first information comprises one or multiple fields in an RRC signaling.

In one embodiment, the first information comprises an IE.

In one embodiment, the first information comprises one or multiple IEs.

In one embodiment, the first information comprises one or multiple fields in an IE.

In one embodiment, the first information is a Medium Access Control layer Control Element (MAC CE) signaling.

In one embodiment, the first information comprises one or multiple fields in a MAC CE signaling.

In one embodiment, the first information comprises an Information Element (IE) ServingCellConfig.

In one embodiment, the first information comprises an IE TDD-UL-DL-ConfigDedicated.

In one embodiment, the first information comprises an IE ServingCellConfigCommon.

In one embodiment, the first information comprises an IE TDD-UL-DL-ConfigCommon.

In one embodiment, the first information comprises at least one of IEs TDD-UL-DL-ConfigCommon or TDD-UL-DL-ConfigDedicated.

In one embodiment, the first information comprises at least one of tdd-UL-DL-ConfigurationCommon or tdd-UL-DL-ConfigurationDedicated.

In one embodiment, a name of the first information comprises TDD-UL-DL (case-insensitive).

In one embodiment, the first information comprises one or multiple fields in an RRC message SIB1.

In one embodiment, the first signaling is a physical-layer signaling.

In one embodiment, the first signaling is a Downlink control information (DCI) format.

In one embodiment, the first signaling is one of DCI format 1_1 or DCI format 1_2.

In one embodiment, the first signaling is DCI format 1_0, for the specific meaning of the DCI format 1_0, refer to section 7.3.1.2 in 3GPP TS38. 212.

In one embodiment, the first signaling is DCI format 1_1, for the specific meaning of the DCI format 1_1, refer to section 7.3.1.2 in 3GPP TS38. 212.

In one embodiment, the first signaling is DCI format 1_2, for the specific meaning of the DCI format 1_2, refer to section 7.3.1.2 in 3GPP TS38. 212.

In one embodiment, the first signaling comprises one or multiple fields in a DCI format.

In one embodiment, the first signaling is a DownLink Grant Signaling.

In one embodiment, the first signaling is a higher-layer signaling.

In one embodiment, the first signaling is an RRC signaling.

In one embodiment, the first signaling comprises one or multiple fields in an RRC signaling.

In one embodiment, the first signaling comprises an IE.

In one embodiment, the second signaling comprises one or multiple fields in an IE.

In one embodiment, the first signaling is a Medium Access Control layer Control Element (MAC CE) signaling.

In one embodiment, the first signaling comprises one or multiple fields in a MAC CE signaling.

In one embodiment, the first signaling is used to explicitly indicate the N resource pools.

In one embodiment, the first signaling is used to implicitly indicate the N resource pools.

In one embodiment, the meaning of the phrase of the first signaling being used to indicate N resource pools comprises: the first signaling is used to indicate time-domain resources occupied by the N resource pools.

In one embodiment, the meaning of the phrase of the first signaling being used to indicate N resource pools comprises: the first signaling is used to indicate frequency-domain resources occupied by the N resource pools.

In one embodiment, the resource pool in the present application is a time-frequency resource pool.

In one embodiment, the resource pool in the present application comprises resources occupied by a channel.

In one embodiment, the resource pool in the present application comprises resources occupied by a physical-layer channel.

In one embodiment, the resource pool in the present application comprises resources reserved for a Physical Downlink Shared CHannel (PDSCH).

In one embodiment, the resource pool in the present application is resources reserved for a PDSCH.

In one embodiment, the resource pool in the present application is comprised within a slot.

In one embodiment, the resource pool in the present application comprises resources occupied by a transport channel.

In one embodiment, the resource pool in the present application comprises multiple REs in time-frequency domain.

In one embodiment, the RE occupies a multicarrier symbol in time domain and a subcarrier in frequency domain.

In one embodiment, the multicarrier symbol in the present application is an Orthogonal Frequency Division Multiplexing (OFDM) symbol.

In one embodiment, the multicarrier symbol in the present application is a Single Carrier-Frequency Division Multiple Access (SC-FDMA) symbol.

In one embodiment, the multicarrier symbol in the present application is a Discrete Fourier Transform Spread OFDM (DFT-S-OFDM) symbol.

In one embodiment, the multicarrier symbol in the present application is a Filter Bank Multicarrier (FBMC) symbol.

In one embodiment, the multicarrier symbol in the present application comprises a Cyclic Prefix (CP).

In one embodiment, each resource pool of the second type among the N resource pools is resources occupied by a PDSCH.

In one embodiment, the N resource pools are respectively reserved for N PDSCHs.

In one embodiment, time-domain resources occupied by the N resource pools are respectively determined by N Start and Length Indicator Values (SLIVs) indicated by the first signaling.

In one embodiment, frequency-domain resources occupied by the N resource pools are the same.

In one embodiment, frequency-domain resources occupied by the N resource pools are indicated by a same field in the first signaling.

In one embodiment, time-domain resources occupied by the N resource pools are indicated by a same field in the first signaling.

In one embodiment, any of the N resource pools is used to transmit at most one transport block.

In one embodiment, any of the N resource pools is used to transmit at most two transport blocks.

In one embodiment, N is equal to 2.

In one embodiment, N is equal to 3.

In one embodiment, N is equal to 4.

In one embodiment, N is equal to 5.

In one embodiment, N is equal to 6.

In one embodiment, N is equal to 7.

In one embodiment, N is equal to 8.

In one embodiment, N is not greater than 1024.

In one embodiment, the first information is used to indicate a type of at least one of the N resource pools.

In one embodiment, the first information is used to explicitly indicate a type of each of the N resource pools.

In one embodiment, the first information is used to implicitly indicate a type of each of the N resource pools.

In one embodiment, the type is a type related to uplink and downlink configuration.

In one embodiment, the type is a type related to a priority.

In one embodiment, the first type is different from the second type.

In one embodiment, the first node drops receiving a PDSCH in each resource pool of the first type among the N resource pools.

In one embodiment, the first node drops receiving a bit block in each resource pool of the first type among the N resource pools.

In one embodiment, the first node does not need to perform a reception of a PDSCH in each resource pool of the first type among the N resource pools.

In one embodiment, a HARQ process corresponding to a PDSCH carried by a resource pool of the first type among the N resource pools is a HARQ process disabled by a HARQ-ACK feedback, and a HARQ process corresponding to a PDSCH carried by a resource pool of the second type among the N resource pools is a HARQ process enabled by a HARQ-ACK feedback.

In one embodiment, the first number is greater than 1 and less than N.

In one embodiment, the bit block in the present application comprises at least one bit.

In one embodiment, the bit block in the present application comprises a Code Block (CB).

In one embodiment, the bit block in the present application comprises a Code Block Group (CBG).

In one embodiment, the bit block in the present application comprises a Transport Block (TB).

In one embodiment, the bit block in the present application is a TB.

In one embodiment, the bit block in the present application is a TB in a PDSCH.

In one embodiment, the bit block in the present application is two TBs in a PDSCH.

In one embodiment, the bit block in the present application is all TBs in a PDSCH.

In one embodiment, the bit block in the present application comprises all TBs in a PDSCH.

In one embodiment, the bit block in the present application is a first TB in a PDSCH.

In one embodiment, the bit block in the present application is a second TB in a PDSCH.

In one embodiment, the target bit is transmitted in a Physical Uplink Control CHannel (PUCCH).

In one embodiment, the target bit is transmitted in a Physical Uplink Shared CHannel (PUSCH).

In one embodiment, the target bit block is transmitted after sequentially through at least part of CRC attachment, Channel Coding, Rate Matching, Code Block Concatenation, Scrambling, Modulation, Spreading, Layer Mapping, Precoding, Mapping to Physical Resources, Generation of Multicarrier Symbol and Modulation and Upconversion.

In one embodiment, a modulation symbol generated by a coding sequence generated by the target bit is transmitted.

In one embodiment, a modulation symbol generated by a sequence generated by the target bit is transmitted.

In one embodiment, the target bit block (together with other bits) is transmitted after sequentially through at least part of CRC attachment, Code Block Segmentation, Code Block CRC attachment, Channel Coding, Rate Matching, Code Block Concatenation, Scrambling, Modulation, Spreading, Layer Mapping, Precoding, mapping to physical resources, Generation of Multicarrier Symbol and Modulation and Upconversion.

In one embodiment, a modulation symbol generated by a coding sequence generated by the target bit (together with other bits) is transmitted.

In one embodiment, a modulation symbol generated by a sequence generated by the target bit (together with other bits) is transmitted.

In one embodiment, the other bits comprise a HARQ-ACK bit other than the target bit.

In one embodiment, the other bits comprise a Channel State Information (CSI) bit.

In one embodiment, the other bits comprise a Scheduling request (SR) bit.

In one embodiment, the other bits comprise a bit in a TB.

In one embodiment, the target binary value is a result after logical And operation of N binary values, and the value of the target bit is equal to the target binary value.

In one embodiment, the N binary values respectively correspond to the N resource pools.

In one embodiment, the N binary values are respectively binary values for the N resource pools.

In one embodiment, the N binary values are respectively binary values generated for the N resource pools.

In one embodiment, the N binary values are respectively binary values used for the N resource pools.

In one embodiment, the N binary values are respectively associated with the N resource pools.

In one embodiment, the meaning of the phrase of a value of the target bit being equal to a target binary value acquired after logical And operation of N binary values comprises: a value of the target bit is equal to an output of an operation equivalent to a first operation; whatever the first number is, the operation equivalent to the first operation always has an output same as the first operation; an output of the first operation is a target binary value, and the first operation is performing logical And operation of N binary values.

In one embodiment, an operation equivalent to the first operation refers to: whatever the first number is, an output is always the same as an output of the first operation.

In one embodiment, in the present application, when whatever the first number is, an output of an operation is always the same as an output of the first operation, and the operation is assumed equivalent to the first operation.

In one embodiment, the target binary value is a result after the N binary values is through logical And operation.

In one embodiment, the meaning of the phrase of whatever the first number being comprises: whichever of values 1, 2, . . . , N the first number is.

In one embodiment, the related description of the first operation in the present application is to describe an output of the operation equivalent to the first operation, and the first operation is not necessarily involved in the actual determination of the value of the target bit.

In one embodiment, when the first number is equal to N, the output of the operation equivalent to the first operation is 0; when the first number is less than N, the output of the first operation equivalent to the first operation indicates whether each of bit block(s) received in each of resource pool(s) of the second type among the N resource pools is correctly decoded.

In one embodiment, the operation equivalent to the first operation refers to: executing a product of min (K2, 1) and (1−min (K2−K3, 1)), K2 is equal to a number of resource pool(s) of the second type among the N resource pools, K2 is a non-negative integer not greater than N, K3 is equal to a number of bit block(s) received a resource pool of the second type among the N resource pools and correctly decoded, and K3 is not greater than K2.

In one embodiment, the meaning of the phrase of a value of the target bit being equal to a target binary value acquired after logical And operation of N binary values comprises: a first procedure is used to acquire a value of the target bit; whatever the first number is, the value of the target bit acquired through the procedure is always the same as an output of a first operation; the first operation is performing logical And operation of N binary values.

In one embodiment, the first process is: when the first number is equal to N, the value of the target bit is 0; when the first number is less than N, the value of the target bit indicates whether each of bit block(s) received in each of resource pool(s) of the second type among the N resource pools is correctly decoded.

In one embodiment, the N binary values in the present application are used to describe an assignment result of the value of the target bit, and the N binary values are not necessarily involved in an actual determination procedure of the value of the target bit.

In one embodiment, the determination of the value of the target bit can be implemented through performing a method equivalent to logical AND operation of the N binary values.

In one embodiment, the N binary values in the present application are used to describe an assignment result of the value of the target bit, the N binary values are not necessarily involved in an actual determination procedure of the value of the target bit, and the determination of the value of the target bit can be implemented through performing a method equivalent to logical AND operation of the N binary values.

In one embodiment, the N binary values in the present application are used to describe an assignment result of the value of the target bit, and the actual determination procedure of the value of the target bit can be performed in other methods (different from performing logical AND operation of N binary values).

In one embodiment, the phrase of a value of the target bit being equal to a target binary value acquired after performing logical AND operation of N binary values in the claim and the related description of the N binary values are instructions adopted to describe an assignment result of the value of the target bit, and are not necessarily the actual execution method adopted to determine the value of the target bit.

In one subembodiment of the above embodiment, the actual determination procedure of the value of the target bit can be implemented in other ways (different from performing logical AND operation of the N binary values).

In one subembodiment of the above embodiment, the value of the target bit can be determined through the following execution method: when the first number is equal to N, a value of the target bit is equal to 0; when the first number is less than N, a value of the target bit indicates whether each of bit block(s) received in each of resource pool(s) of the second type among the N resource pools is correctly decoded.

In one embodiment, when the first number is less than N: bit value 1 indicates that each of bit block(s) received in each of resource pool(s) of the second type among the N resource pools is correctly decoded, and bit value 0 indicates that at least one bit block received in at least one resource pool of the second type among the N resource pools is not correctly decoded.

In one embodiment, for each of the N binary values, if the type of a corresponding resource pool among the N resource pools is the first type, the binary value is a virtual binary value introduced to acquire the value of the target bit.

In one embodiment, the meaning of the phrase of a value of the target bit being equal to a target binary value acquired after logical And operation of N binary values comprises: a value of the target bit is equal to a value (acquired through other methods different from performing logical AND operation of N binary values) the same as a target binary value acquired after performing logical AND operation of N binary values.

In one embodiment, the meaning of the phrase of a value of the target bit being equal to a target binary value acquired after logical And operation of N binary values comprises: when the first number is equal to N, the value of the target bit is equal to 0; when the first number is less than N, the value of the target bit indicates whether each of bit block(s) received in each of resource pool(s) of the second type among the N resource pools is correctly decoded.

In one embodiment, the meaning of the phrase of a value of the target bit being equal to a target binary value acquired after logical And operation of N binary values refers to: when the first number is equal to N, the value of the target bit is equal to 0; when the first number is less than N, value of the target bit indicates whether each of bit block(s) received in each of resource pool(s) of the second type among the N resource pools is correctly decoded.

In one embodiment, the meaning of the phrase of a value of the target bit being equal to a target binary value acquired after logical And operation of N binary values;

herein, for each of the N binary values, if the type of a corresponding resource pool among the N resource pools is the second type, the binary value indicating whether a bit block received in the resource pool is correctly decoded, and if the type of a corresponding resource pool among the N resource pools is the first type, the binary value depending on the first number comprises: when the first number is equal to N, a value of the target bit is equal to 0; when the first number is less than N, a value of the target bit indicates whether each of bit block(s) received in each of resource pool(s) of the second type among the N resource pools is correctly decoded.

In one embodiment, the value of the target bit is equal to a product of min (K2, 1) and (1−min (K2−K3, 1)), K2 is equal to a number of resource pool(s) of the second type among the N resource pools, K2 is a non-negative integer not greater than N, K3 is equal to a number of bit block(s) received a resource pool of the second type among the N resource pools and correctly decoded, and K3 is not greater than K2.

In one embodiment, binary value 1 indicates that each of bit block(s) received in a resource pool is correctly decoded, and binary value 0 indicates that at least one bit block received in a resource pool is not correctly decoded.

In one embodiment, the meaning of the phrase of the binary value depending on the first number comprises: the first number is used to determine the binary value.

In one embodiment, the meaning of the phrase of the binary value depending on the first number comprises: the first number is used to indicate the binary value.

In one embodiment, the meaning of the phrase of the binary value depending on the first number comprises: the first number is used to implicitly indicate the binary value.

In one embodiment, there is no time-domain overlapping among the N resource pools.

In one embodiment, the N resource pools respectively belong to N slots in time domain.

In one embodiment, the N resource pools respectively belong to N sub-slots in time domain.

In one embodiment, the N resource pools respectively belong to N mini-slots in time domain.

In one embodiment, the N resource pools respectively belong to N continuous slots in time domain.

In one embodiment, the N resource pools respectively belong to N continuous sub-slots in time domain.

In one embodiment, the N resource pools respectively belong to N continuous mini-slots in time domain.

In one embodiment, the N resource pools respectively occupy different multicarrier symbols in time domain.

In one embodiment, any two of the N resource pools occupy a same number of multicarrier symbol(s).

In one embodiment, there exist two of the N resource pools occupying different numbers of multicarrier symbol(s).

In one embodiment, the first number plus a number of resource pool(s) of the second type among the N resource pools is equal to N.

Embodiment 2

Figure 2:
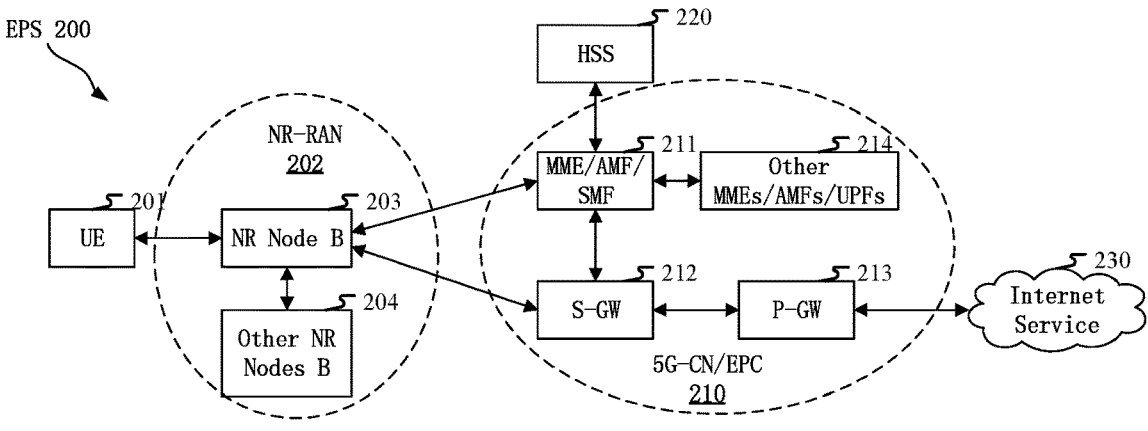
FIG. 2 illustrates a schematic diagram of a network architecture according to one embodiment of the present application.

Embodiment 2 illustrates a schematic diagram of a network architecture according to the present application, as shown in FIG. 2.

FIG. 2 illustrates a network architecture 200 of 5G NR, Long-Term Evolution (LTE) and Long-Term Evolution Advanced (LTE-A) systems. The NR 5G or LTE network architecture 200 may be called an Evolved Packet System (EPS) 200 or other appropriate terms. The EPS 200 may comprise one or more UEs 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will readily understand that various concepts presented throughout the present application can be extended to networks providing circuit switching services or other cellular networks. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the EPC/5G-CN 210 for the UE 201. Examples of the UE 201 include cellular phones, smart phones, Session Initiation Protocol (SIP) phones, laptop computers, Personal Digital Assistant (PDA), satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles (UAV), aircrafts, narrow-band Internet of Things (IoT) devices, machine-type communication devices, land vehicles, automobiles, wearable devices, or any other similar functional devices. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the EPC/5G-CN 210 via an S1/NG interface. The EPC/5G-CN 210 comprises a Mobility Management Entity (MME)/Authentication Management Field (AMF)/User Plane Function (UPF) 211, other MMES/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present application.

In one embodiment, the UE 201 corresponds to the second node in the present application.

In one embodiment, the gNB 203 corresponds to the first node in the present application.

In one embodiment, the gNB 203 corresponds to the second node in the present application.

In one embodiment, the UE 201 corresponds to the first node in the present application, and the gNB 203 corresponds to the second node in the present application.

In one embodiment, the gNB 203 is a MarcoCellular base station.

In one embodiment, the gNB 203 is a Micro Cell base station.

In one embodiment, the gNB 203 is a PicoCell base station.

In one embodiment, the gNB 203 is a Femtocell.

In one embodiment, the gNB 203 is a base station that supports large latency differences.

In one embodiment, the gNB 203 is a flight platform.

In one embodiment, the gNB 203 is satellite equipment.

In one embodiment, both the first node and the second node in the present application correspond to the UE 201, for example, V2X communications are performed between the first node and the second node.

Embodiment 3

Figure 3:
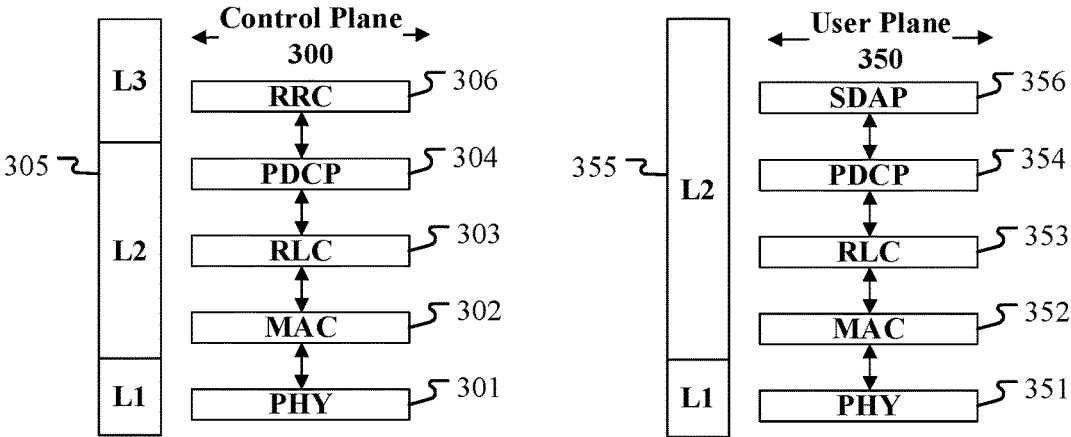
FIG. 3 illustrates a schematic diagram of a radio protocol architecture of a user plane and a control plane according to one embodiment of the present application.

Embodiment 3 illustrates a schematic diagram of an example of a radio protocol architecture of a user plane and a control plane according to one embodiment of the present application, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present application. The layer 2 (L2) 305 is above the PHY 301, and is in charge of a link between a first communication node and a second communication node, as well as two UEs via the PHY 301. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present application.

In one embodiment, the radio protocol architecture in FIG. 3 is applicable to the second node in the present application.

In one embodiment, the first information in the present application is generated by the RRC sublayer 306.

In one embodiment, the first information in the present application is generated by the MAC sublayer 302.

In one embodiment, the first information in the present application is generated by the MAC sublayer 352.

In one embodiment, the first signaling in the present application is generated by the RRC sublayer 306.

In one embodiment, the first signaling in the present application is generated by the MAC sublayer 302.

In one embodiment, the first signaling in the present application is generated by the MAC sublayer 352.

In one embodiment, the first signaling in the present application is generated by the PHY 301.

In one embodiment, the first signaling in the present application is generated by the PHY 351.

In one embodiment, the target bit in the present application is generated by the MAC sublayer 302.

In one embodiment, the target bit in the present application is generated by the MAC sublayer 352.

In one embodiment, the target bit in the present application is generated by the PHY 301.

In one embodiment, the target bit in the present application is generated by the PHY 351.

In one embodiment, one of the M bit(s) in the present application is generated by the MAC sublayer 302.

In one embodiment, one of the M bit(s) in the present application is generated by the MAC sublayer 352.

In one embodiment, one of the M bit(s) in the present application is generated by the PHY 301.

In one embodiment, one of the M bit(s) in the present application is generated by the PHY 351.

Embodiment 4

Figure 4:
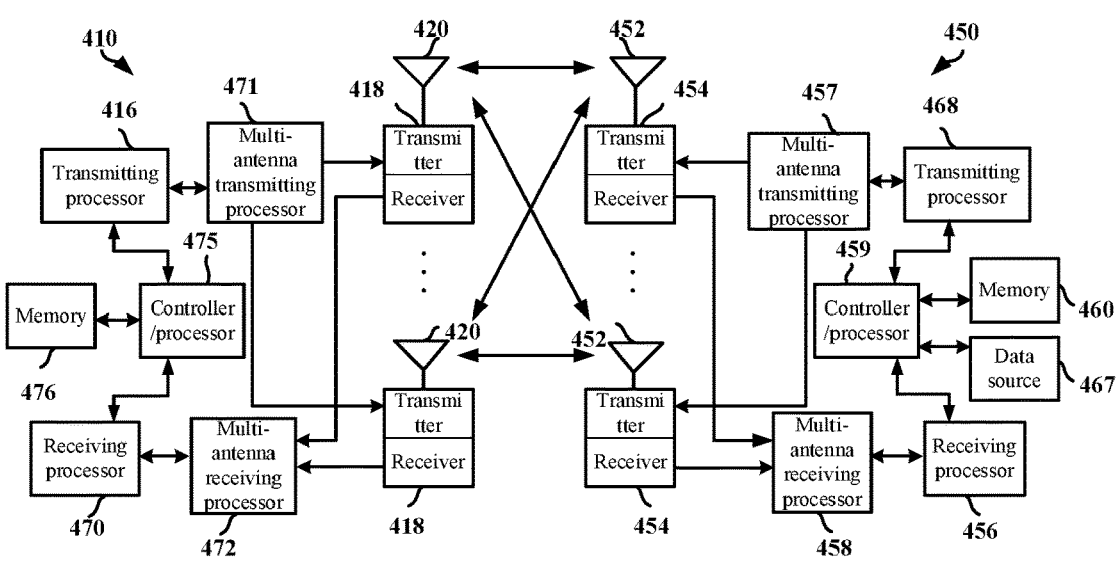
FIG. 4 illustrates a schematic diagram of a first communication device and a second communication device according to one embodiment of the present application.

Embodiment 4 illustrates a schematic diagram of a first communication device and a second communication device in the present application, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In the transmission from the first communication device 410 to the first communication device 450, the controller/processor 475 provides header compression, encryption, packet segmentation and reordering, and multiplexing between a logical channel and a transport channel, and radio resources allocation to the second communication device 450 based on various priorities. The controller/processor 475 is also responsible for retransmission of a lost packet and a signaling to the second communication device 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any the second communication device-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In the transmission from the first communication device 410 to the second communication device 450, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in the transmission from the first communication device 410 to the second communication device 450, the controller/processor 459 performs header compression, encryption, packet segmentation and reordering, and multiplexing between a logical channel and a transport channel based on radio resources allocation so as to provide the L2 layer functions used for the user plane and the control plane. The controller/processor 459 is also responsible for retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated spatial streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. In the transmission from the second communication device 450 to the first communication device 410, the controller/processor 475 provides de-multiplexing between a transport channel and a logical channel, packet reassembling, decryption, header decompression, control signal processing so as to recover a higher-layer packet from the UE 450. The higher-layer packet coming from the controller/processor 475 may be provided to the core network.

In one embodiment, the first node in the present application comprises the second communication device 450, and the second node in the present application comprises the first communication device 410.

In one subembodiment of the above embodiment, the first node is a UE, and the second node is a UE.

In one subembodiment of the above embodiment, the first node is a UE, and the second node is a relay node.

In one subembodiment of the above embodiment, the first node is a relay node, and the second node is a UE.

In one subembodiment of the above embodiment, the first node is a UE, and the second node is a base station.

In one subembodiment of the above embodiment, the first node is a relay node, and the second node is a base station.

In one subembodiment of the above embodiment, the second node is a UE, and the first node is a base station.

In one subembodiment of the above embodiment, the second node is a relay node, and the first node is a base station.

In one subembodiment of the above embodiment, the second communication device 450 comprises: at least one controller/processor; the at least one controller/processor is responsible for HARQ operation.

In one subembodiment of the above embodiment, the first communication device 410 comprises: at least one controller/processor; the at least one controller/processor is responsible for HARQ operation.

In one subembodiment of the above embodiment, the first communication device 410 comprises: at least one controller/processor; the at least one controller/processor is responsible for error detection using ACK and/or NACK protocols as a way to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type among the N resource pools is a first number, the first number being a positive integer; when the first number is less than N, receives a bit block in each resource pool of the second type among the N resource pools; transmits a target bit, a value of the target bit is equal to a target binary value acquired after logical And operation of N binary values; herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving first information and a first signaling, the first signaling being used to indicate N resource pools, N being a positive integer greater than 1, the first information being used to determine a type of at least one of the N resource pools, the type of any of the N resource pools being one of a first type and a second type, a number of resource pool(s) of the first type among the N resource pools being a first number, the first number being a positive integer; when the first number is less than N, receiving a bit block in each resource pool of the second type among the N resource pools; transmitting a target bit, a value of the target bit being equal to a target binary value acquired after logical And operation of N binary values; herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type among the N resource pools is a first number, the first number being a positive integer; when the first number is less than N, transmits a bit block in each resource pool of the second type among the N resource pools; receives a target bit, a value of the target bit is equal to a target binary value acquired after logical And operation of N binary values; herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting first information and a first signaling, the first signaling being used to indicate N resource pools, N being a positive integer greater than 1, the first information being used to determine a type of at least one of the N resource pools, the type of any of the N resource pools being one of a first type and a second type, a number of resource pool(s) of the first type among the N resource pools being a first number, the first number being a positive integer; when the first number is less than N, transmitting a bit block in each resource pool of the second type among the N resource pools; receiving a target bit, a value of the target bit being equal to a target binary value acquired after logical And operation of N binary values; herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one subembodiment of the above embodiment, the first communication device 410 corresponds to the second node in the present application.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type among the N resource pools is a first number, the first number being a positive integer; when the first number is less than N, receives a bit block in each resource pool of the second type among the N resource pools; transmits a target bit; when the first number is equal to N, a value of the target bit is equal to 0; when the first number is less than N, a value of the target bit indicates whether each of bit block(s) received in each of resource pool(s) of the second type among the N resource pools is correctly decoded.

In one subembodiment of the above embodiment, the second communication device 450 corresponds to the first node in the present application.

In one embodiment, the second communication device 450 comprises a memory that stores a computer readable instruction program. The computer readable instruction program generates an action when executed by at least one processor. The action includes: receiving first information and a first signaling, the first signaling being used to indicate N resource pools, N being a positive integer greater than 1, the first information being used to determine a type of at least one of the N resource pools, the type of any of the N resource pools being one of a first type and a second type, a number of resource pool(s) of the first type among the N resource pools being a first number, the first number being a positive integer; when the first number is less than N, receiving a bit block in each resource pool of the second type among the N resource pools; transmitting a target bit; when the first number is equal to N, a value of the target bit is equal to 0; when the first number is less than N, a value of the target bit indicates whether each of bit(s) received in each of resource pool(s) of the second type among the N resource pools is correctly decoded.

In one subembodiment of the above embodiment, the second communication device 450 corresponds to the first node in the present application.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type in the N resource pools is a first number, the first number being a positive integer; when the first number is less than N, transmits a bit block in each resource pool of the second type in the N resource pools; receives a target bit; when the first number is equal to N, a value of the target bit is equal to 0; when the first number is less than N, a value of the target bit indicates whether each of bit(s) received in each of resource pool(s) of the second type among the N resource pools is correctly decoded.

In one subembodiment of the above embodiment, the first communication device 410 corresponds to the second node in the present application.

In one embodiment, the first communication device 410 comprises a memory that stores a computer readable instruction program. The computer readable instruction program generates an action when executed by at least one processor. The action includes: transmitting first information and a first signaling, the first signaling being used to indicate N resource pools, N being a positive integer greater than 1, the first information being used to determine a type of at least one of the N resource pools, the type of any of the N resource pools being one of a first type and a second type, a number of resource pool(s) of the first type among the N resource pools being a first number, the first number being a positive integer; when the first number is less than N, transmitting a bit block in each resource pool of the second type among the N resource pools; receiving a target bit; when the first number is equal to N, a value of the target bit is equal to 0; when the first number is less than N, a value of the target bit indicates whether each of bit(s) received in each of resource pool(s) of the second type among the N resource pools is correctly decoded.

In one subembodiment of the above embodiment, the first communication device 410 corresponds to the second node in the present application.

In one embodiment, at least one of the antenna 452, the receiver 454, the multi-antenna receiving processor 458, the receiving processor 456, the controller/processor 459, the memory 460, or the data source 467 is used to receive the first information in the present application.

In one embodiment, at least one of the antenna 420, the transmitter 418, the multi-antenna transmitting processor 471, the transmitting processor 416, the controller/processor 475, or the memory 476 is used to transmit the first information in the present application.

In one embodiment, at least one of the antenna 452, the receiver 454, the multi-antenna receiving processor 458, the receiving processor 456, the controller/processor 459, the memory 460, or the data source 467 is used to receive the first signaling in the present application.

In one embodiment, at least one of the antenna 420, the transmitter 418, the multi-antenna transmitting processor 471, the transmitting processor 416, the controller/processor 475, or the memory 476 is used to transmit the first signaling in the present application.

In one embodiment, at least one of the antenna 452, the transmitter 454, the multi-antenna transmitting processor 458, the transmitting processor 468, the controller/processor

459, the memory 460, or the data sources 467 is used to transmit the target bit in the present application.

In one embodiment, at least one of the antenna 420, the receiver 418, the multi-antenna receiving processor 472, the receiving processor 470, the controller/processor 475, or the memory 476 is used to receive the target bit in the present application.

In one embodiment, at least one of the antenna 452, the transmitter 454, the multi-antenna transmitting processor 458, the transmitting processor 468, the controller/processor 459, the memory 460, or the data sources 467 is used to transmit the M bit(s) in the present application.

In one embodiment, at least one of the antenna 420, the receiver 418, the multi-antenna receiving processor 472, the receiving processor 470, the controller/processor 475, or the memory 476 is used to receive the M bit(s) in the present application.

Embodiment 5

Figure 5:
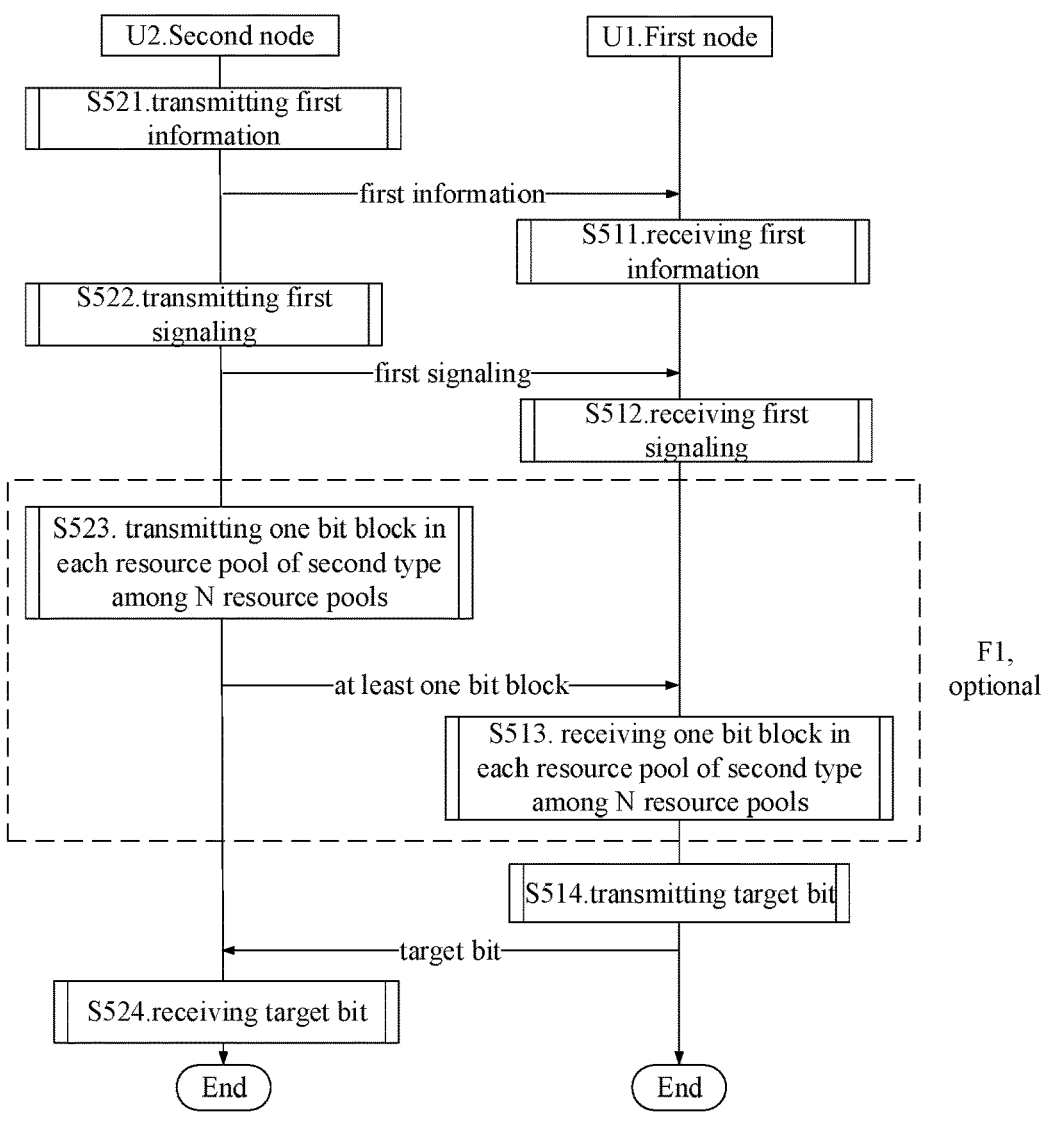
FIG. 5 illustrates a flowchart of signal transmission according to one embodiment of the present application.

Embodiment 5 illustrates a flowchart of signal transmission according to one embodiment in the present application, as shown in FIG. 5. In FIG. 5, a first node U1 and a second node U2 are in communications via an air interface. In FIG. 5, steps in dotted box F1 are optional.

The first node U1 receives first information in step S511; receives a first signaling in step S512; receives a bit block in each resource pool with a type of a second type among N resource pools in step S513; and transmits a target bit in step S514.

The second node U2 transmits first information in step S521; transmits a first signaling in step S522; transmits a bit block in each resource pool with a type of a second type among N resource pools in step S523; and receives a target bit in step S524.

In Embodiment 5, the first signaling is used to indicate N resource pools, N is a positive integer greater than 1, the first information is used to determine a type of at least one of the N resource pools, the type of any of the N resource pools is one of a first type and a second type, a number of resource pool(s) of the first type in the N resource pools is a first number, the first number is a positive integer; when the first number is less than N, the first node U2 transmits a bit block in each resource pool of the second type among the N resource pools, and the first node U1 receives a bit block in each resource pool of the second type among the N resource pools; a first time unit group comprises multiple time units, and each of the N resource pools comprises at least one time unit belonging to the first time unit group in time domain; the first information is used to determine a first-type time unit in the first time unit group, and a resource pool of the first type among the N resource pools is a resource pool comprising at least one first-type time unit belonging to the first time unit group; there is no time-domain overlapping among the N resource pools; the target bit is a HARQ-ACK bit, and the target bit belongs to a Type-2 HARQ-ACK codebook.

In one subembodiment of embodiment 5, a value of the target bit is equal to a target binary value acquired after logical And operation of N binary values; for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one subembodiment of embodiment 5, when the first number is equal to N, a value of the target bit is equal to 0; when the first number is less than N, a value of the target bit indicates whether each of bit(s) received in each of resource pool(s) of the second type among the N resource pools is correctly decoded.

In one subembodiment of embodiment 5, a value of the target bit is equal to a target binary value acquired after logical And operation of N binary values; for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number; the target bit is one of M bit(s) transmitted by the first node U1, and the second node U2 receives the M bit(s); the first signaling is used to indicate M0 resource pool groups, any of the M0 resource pool groups comprises at least one resource pool, and the N resource pools belong a same resource pool group among the M0 resource pool groups; the M bit(s) corresponds (respectively correspond) to M resource pool group(s) among the M0 resource pool groups; M0 is a positive integer greater than 1, and M is a positive integer not greater than the M0.

In one subembodiment of embodiment 5, when the first number is equal to N, a value of the target bit is equal to 0; when the first number is less than N, a value of the target bit indicates whether each of bit block(s) received in each of resource pool(s) of the second type among the N resource pools is correctly decoded; the target bit is one of M bit(s) transmitted by the first node U1, and the second node U2 receives the M bit(s); the first signaling is used to indicate M0 resource pool groups, any of the M0 resource pool groups comprises at least one resource pool, and the N resource pools belong a same resource pool group among the M0 resource pool groups; the M bit(s) corresponds (respectively correspond) to M resource pool group(s) among the M0 resource pool groups; M0 is a positive integer greater than 1, and M is a positive integer not greater than the M0.

In one subembodiment of embodiment 5, a value of the target bit is equal to a target binary value acquired after logical And operation of N binary values; for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number; the target bit is one of M bit(s) transmitted by the first node U1, and the second node U2 receives the M bit(s); the first signaling is used to indicate M0 resource pool groups, any of the M0 resource pool groups comprises at least one resource pool, and the N resource pools belong a same resource pool group among the M0 resource pool groups; the M bit(s) corresponds (respectively correspond) to M resource pool group(s) among the M0 resource pool groups; M0 is a positive integer greater than 1, and M is a positive integer not greater than the M0; there exists one of the M0 resource pool groups comprising at least one resource pool of the second type; only when at least P resource pool groups in the M0 resource pool groups respectively comprise at least one resource pool of the second type or the first number is less than N, the target bit is transmitted; P is a positive integer greater than 1 and not greater than M0, P is a default or configurable value.

In one embodiment, the first node U1 is the first node in the present application.

In one embodiment, the second node U2 is the second node in the present application.

In one embodiment, the first node U1 is a UE.

In one embodiment, the first node U 1 is a base station.

In one embodiment, the second node U2 is a base station.

In one embodiment, the second node U2 is a UE.

In one embodiment, an air interface between the second node U2 and the first node U1 is a Uu interface.

In one embodiment, an air interface between the second node U2 and the first node U1 comprises a cellular link.

In one embodiment, an air interface between the second node U2 and the first node U1 is a PC5 interface.

In one embodiment, an air interface between the second node U2 and the first node U1 comprises a sidelink.

In one embodiment, an air interface between the second node U2 and the first node U1 comprises a radio interface between a base station and a UE.

In one embodiment, an air interface between the second node U2 and the first node U1 comprises a radio interface between a satellite and a UE.

In one embodiment, an air interface between the second node U2 and the first node U1 comprises a radio interface between UEs.

In one embodiment, when the first number is less than N, steps in the dotted box F1 exist.

In one embodiment, when the first number is equal to N, steps in the dotted box F1 do not exist.

In one embodiment, a given binary value is one of the N binary values, and the given binary value corresponds to a resource pool of the first type among the N resource pools: when the first number is equal to N, the given binary value is equal to 1; and when the first number is less than N, the given binary value is equal to 0.

In one embodiment, a given binary value is one of the N binary values, and the given binary value corresponds to a resource pool of the first type among the N resource pools: when the first number is not less than N minus 1, the given binary value is equal to 1; and when the first number is less than N minus 1, the given binary value is equal to 0.

In one embodiment, a given binary value is one of the N binary values, and the given binary value corresponds to a resource pool of the first type among the N resource pools: when the first number is not less than N minus 1, the given binary value is equal to 0; when the first number is less than N minus 1, the given binary value is equal to 1.

In one embodiment, the first node is provided with a harq-ACK-SpatialBundlingPUCCH.

In one embodiment, the first node is provided with a harq-ACK-SpatialBundlingPUSCH.

In one embodiment, a resource pool of the first type among the N resource pools has a time-domain overlapping resource pool with at least one multicarrier symbol configured as UL, and a resource pool of the second type among the N resource pools has no time-domain overlapping resource pool with a multicarrier symbol configured as UL.

In one embodiment, a first time unit group comprises multiple time units, and each of the N resource pools comprises at least one time unit belonging to the first time unit group in time domain; the first information is used to determine a first-type time unit in the first time unit group, and a resource pool of the first type among the N resource pools is a resource pool having a time-domain overlapping with at least one the first-type time unit belonging to the first time unit group.

In one subembodiment of the above embodiment, a resource pool of the second type among the N resource pools is a resource pool having no time-domain overlapping with any the first-type time unit belonging to the first time unit group.

In one embodiment, a first time unit group comprises multiple time units, and each of the N resource pools comprises at least one time unit belonging to the first time unit group in time domain; the first information is used to determine a first-type time unit in the first time unit group, a resource pool of the second type among the N resource pools is a resource pool comprising at least one the first-type time unit belonging to the first time unit group, and a resource pool of the first type among the N resource pools is a resource pool not comprising the first-type time unit belonging to the first time unit group.

In one embodiment, the phrase of a received bit block refers to: a bit block received by the first node.

Embodiment 6

Figure 6:
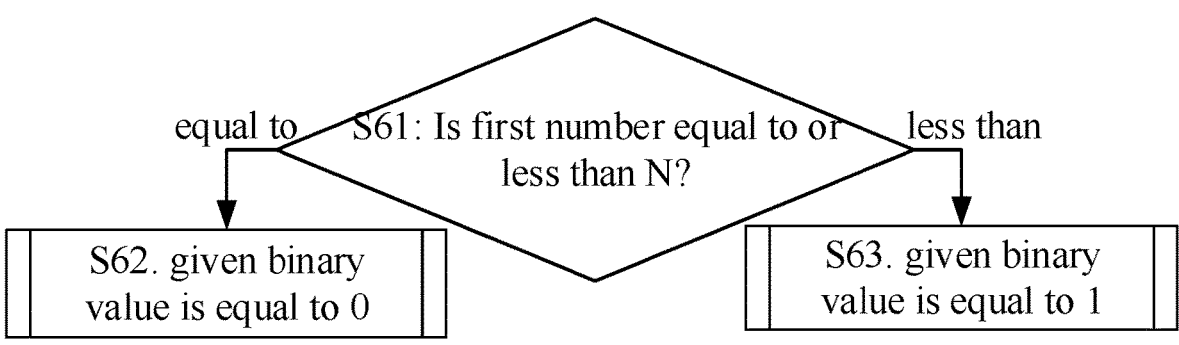
FIG. 6 illustrate a schematic diagram of a relation between a given binary value and a first number according to one embodiment of the present application.

Embodiment 6 illustrates a schematic diagram of a relation between a given binary value and a first number according to one embodiment of the present application, as shown in FIG. 6. In FIG. 6, determine whether a first number is equal to or less than N in step S61, a given binary is equal to 0 in step S62, and a given binary value is equal to 1 in step S63.

In embodiment 6, a given binary value is one of the N binary values in the present application, and the given binary value corresponds to a resource pool of the first type among the N resource pools in the present application: when the first number in the present application is equal to N in the present application, the given binary value is equal to 0; and when the first number is less than N, the given binary value is equal to 1.

In one embodiment, a binary value is equal to one of 0 or 1.

In one embodiment, a binary value corresponding to a resource pool of the first type among the N resource pools is a binary value determined for the resource pool.

In one embodiment, a binary value corresponding to a resource pool of the first type among the N resource pools is a binary value generated for the resource pool.

In one embodiment, a binary value corresponding to a resource pool of the first type among the N resource pools is a binary value generated for a corresponding PDSCH.

In one embodiment, a binary value corresponding to a resource pool of the first type among the N resource pools is a virtual binary value.

In one embodiment, it is assumed that there exists a binary value corresponding to a resource pool of the first type among the N resource pools.

In one embodiment, the given binary value is any of the N binary values corresponding to a resource pool of the first type among the N resource pools.

Embodiment 7

Figure 7:
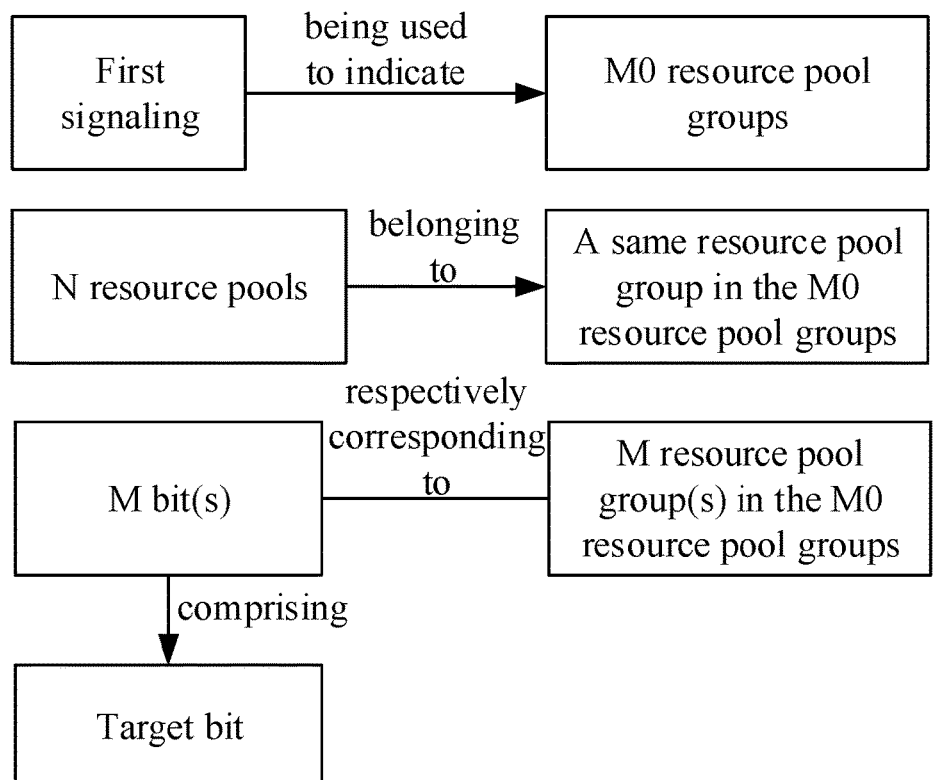
FIG. 7 illustrates a schematic diagram of relations among a first signaling, M0 resource pool groups, N resource pools, M bit(s) and a target bit according to one embodiment of the present application.

Embodiment 7 illustrates a schematic diagram of relations among a first signaling, M0 resource pool groups, N resource pools, M bit(s) and a target bit according to one embodiment of the present application, as shown in FIG. 7.

In Embodiment 7, the first node in the present application transmits M bit(s), and the target bit in the present application is one of the M bit(s); the first signaling in the present application is used to indicate M0 resource pool groups, any of the M0 resource pool groups comprises at least one resource pool, and the N resource pools in the present application belong to a same resource pool group in the M0 resource pool groups; the M bit(s) corresponds (respectively correspond) to M resource pool group(s) among the M0 resource pool groups; M0 is a positive integer greater than 1, and M is a positive integer not greater than the M0.

In one embodiment, M0 is equal to 2.

In one embodiment, M0 is equal to 3.

In one embodiment, M0 is equal to 4.

In one embodiment, M0 is equal to 5.

In one embodiment, M0 is equal to 6.

In one embodiment, M0 is equal to 7.

In one embodiment, M0 is equal to 8.

In one embodiment, M0 is not greater than 64.

In one embodiment, M is equal to 1.

In one embodiment, M is greater than 1.

In one embodiment, M is equal to the M0.

In one embodiment, M is less than the M0.

In one embodiment, any of the M bit(s) is a HARQ-ACK bit.

In one embodiment, each of the M0 resource pools is respectively reserved for a PD SCH.

In one embodiment, the first signaling is used to explicitly indicate the M0 resource pools.

In one embodiment, the first signaling is used to implicitly indicate the M0 resource pools.

In one embodiment, the meaning of the phrase of the first signaling being used to indicate M0 resource pool groups comprises: the first signaling is used to indicate time-domain resources occupied by each resource pool comprised in the M0 resource pool groups.

In one embodiment, the meaning of the phrase of the first signaling being used to indicate M0 resource pool groups comprises: the first signaling is used to indicate frequency-domain resources occupied by each resource pool comprised in the M0 resource pool groups.

In one embodiment, any two of the M0 resource pool groups comprise a same number of resource pool(s).

In one embodiment, there exist two of the M0 resource pool groups comprising different numbers of resource pool(s).

In one embodiment, a number of resource pool(s) comprised in each of the M0 resource pool groups is equal to N.

In one embodiment, any two of the M0 resource pool groups are non-overlapping in time domain.

In one embodiment, multiple resource pools in the M0 resource pool groups respectively belong to multiple different slots.

In one embodiment, the M bit(s) is (are respectively) HARQ-ACK bit(s) generated for M resource pool group(s) in the M0 resource pool groups.

In one embodiment, the target bit corresponds to a resource pool group to which the N resource pools in the M0 resource pool groups belong.

In one embodiment, the M bit(s) is (are respectively) associated with M resource pool group(s) in the M0 resource pool groups.

In one embodiment, the target bit is associated with a resource pool group to which the N resource pools in the M0 resource pool groups belong.

In one embodiment, the N resource pools constitute one of the M0 resource pool groups, and an association method between the M bit(s) and M resource pool group(s) in the M0 resource pool groups is the same as an association method between the target bit and the N resource pools.

In one embodiment, any of the M0 resource pool groups is used to carry at most one TB.

In one embodiment, any of the M0 resource pool groups is used to carry at most two TBs.

In one embodiment, the first signaling is used to indicate multiple resource pools, and a higher-layer signaling is used to divide the multiple resource pools indicated by the first signaling into the M0 resource pool groups.

In one embodiment, the first signaling is used to indicate multiple resource pools, and the multiple resource pools indicated by the first signaling are divided into the M0 resource pool groups based on a predefined rule.

In one embodiment, the first signaling is used to indicate multiple resource pools, and the multiple resource pools indicated by the first signaling are divided into the M0 resource pool groups according to an ascending order in time domain.

In one embodiment, the M bit(s) belongs (belong) to a same HARRQ-ACK codebook.

In one embodiment, the M bit(s) belongs (belong) to a same HARQ-ACK sub-codebook.

Embodiment 8

Figure 8:
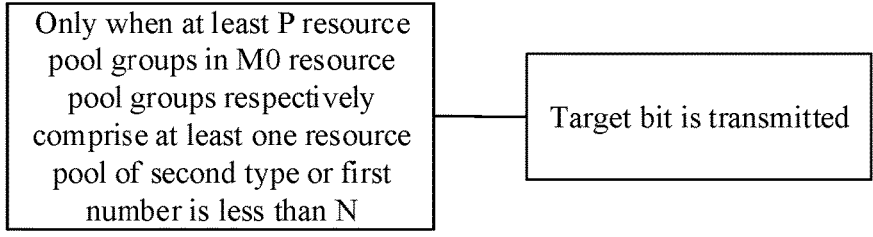
FIG. 8 illustrates an illustration schematic diagram of determining that a target bit is transmitted according to one embodiment of the present application.

Embodiment 8 illustrates an illustration schematic diagram of determining a target bit being transmitted according to one embodiment of the present application, as shown in FIG. 8.

In embodiment 8, there exists a resource pool group comprising at least one resource pool of the second type in the present application among the M0 resource pool group(s) in the present application; only when at least P resource pool groups in the M0 resource pool groups respectively comprise at least one resource pool of the second type or the first number in the present application is less than N in the present application, the target bit in the present application is transmitted; P is a positive integer greater than 1 and not greater than M0, P is a default or configurable value.

In one embodiment, P is equal to 2.

In one embodiment, P is equal to 3.

In one embodiment, P is equal to M0 minus 1.

In one embodiment, the meaning of the phrase of P being a default or configurable value comprises: P is a constant.

In one embodiment, the meaning of the phrase of P being a default or configurable value comprises: P is equal to 2.

In one embodiment, the meaning of the phrase of P being a default or configurable value comprises: P is configured by an RRC signaling.

In one embodiment, the meaning of the phrase of P being a default or configurable value comprises: P is configured by a MAC CE signaling.

In one embodiment, when at most P−1 resource pool group(s) in the M0 resource pool groups comprises (respectively comprise) a resource pool of the second type and the first number is equal to N, the target bit is not transmitted.

In one embodiment, when at least M0−P+1 resource pool(s) in the M0 resource pool groups does not comprise a resource pool with type of the second type and the first number is equal to N, the target bit is not transmitted.

Embodiment 9

Embodiment 9 illustrates an illustration schematic diagram of a type of a resource pool according to one embodiment of the present application, as shown in FIG. 9. In FIG. 9, a small rectangle represents a time unit in a first time unit group, a slash-filled small rectangle represents a first-type time unit in a first time unit group, an unfilled small rectangle represents a time unit other than a first-type time unit in a first time unit group, and a bold rectangle represents one of N resource pools.

In embodiment 9, a first time unit group comprises multiple time units, and each of the N resource pools in the present application comprises at least one time unit belonging to the first time unit group in time domain; the first information in the present application is used to determine a first-type time unit in the first time unit group, a resource pool of the first type in the present application among the N resource pools is a resource pool comprising at least one the first-type time unit belonging to the first time unit group, and a resource pool of the second type in the present application among the N resource pools is a resource pool not comprising the first-type time unit belonging to the first time unit group.

In one embodiment, the time unit is a multicarrier symbol.

In one embodiment, the time unit comprises a multicarrier symbol.

In one embodiment, the time unit is 1 ms.

In one embodiment, the time unit is a slot.

In one embodiment, the first time unit group comprises all time units occupied by the N resource pools in time domain.

In one embodiment, the first time unit group comprises all time units occupied by at least one DL-UL pattern cycle to which the N resource pools belong.

In one embodiment, the first information is used to indicate at least one the first-type time unit in the first time unit group.

In one embodiment, the first information is used to explicitly indicate at least one the first-type time unit in the first time unit group.

In one embodiment, the first information is used to implicitly indicate at least one the first-type time unit in the first time unit group.

In one embodiment, the first information is used to configure at least one time unit in the first time unit group as the first-type time unit.

In one embodiment, the first-type time unit is a time unit configured as Uplink (UL).

In one embodiment, the first-type time unit comprises a time unit configured as UL.

In one embodiment, the first-type time unit comprises a time unit indicated to receive an SS/PBCH block through ssb-PositionsInBurst in SIB1 or ssb-PositionsInBurst in ServingCellConfigCommon.

In one embodiment, the first-type time unit is a semi-static UL symbol.

In one embodiment, the first-type time unit is a time unit not used for a downlink transmission.

In one embodiment, the first-type time unit is a time unit not used for a PDSCH transmission.

In one embodiment, a resource pool of the second type among the N resource pools is a resource pool not comprising any the first-type time unit in the first time unit group.

In one embodiment, each of the N resource pools in the present application comprises at least one time unit in time domain; the first information in the present application is used to determine a first-type time unit, a resource pool with the first type in the present application among the N resource pools is a resource pool comprising at least one the first-type time unit, and a resource pool of the second type in the present application among the N resource pools is a resource pool not comprising the first-type time unit.

In one embodiment, the first information is used to indicate which time unit is the first-type time unit.

In one embodiment, the first information is used to explicitly indicate which time unit is the first-type time unit.

In one embodiment, the first information is used to implicitly indicate which time unit is the first-type time unit.

In one embodiment, the first information is used to configure at least one time unit as the first-type time unit.

Embodiment 10

Embodiment 10 illustrates an illustration schematic diagram of a target bit according to one embodiment of the present application, as shown in FIG. 10.

In Embodiment 10, the target bit in the present application is a HARQ-ACK bit, and the target bit belongs to a Type-2 HARQ-ACK codebook.

In one embodiment, the target bit is a HARQ-ACK bit.

In one embodiment, the target bit belongs to a Type-2 HARQ-ACK codebook, and the first node transmits the Type-2 HARQ-ACK codebook.

In one embodiment, for the description of the Type-2 HARQ-ACK codebook, refer to section 9.1.3 in 3GPP TS38.213.

In one embodiment, the Type-2 HARQ-ACK codebook is a HARQ-ACK codebook determined based on DAI counting.

In one embodiment, the second-type HARQ-ACK codebook to which the target bit belongs comprises multiple HARQ-ACK bits.

Embodiment 11

Embodiment 11 illustrates a structure block diagram of a processor in a first node, as shown in FIG. 11. In FIG. 11, a processor 1100 in a first node comprises a first receiver 1101 and a first transmitter 1102.

In one embodiment, the first node 1100 is a UE.

In one embodiment, the first node 1100 is a relay node.

In one embodiment, the first node 1100 is a vehicle-mounted communication device.

In one embodiment, the first node 1100 is a UE supporting V2X communications.

In one embodiment, the first node 1100 is a relay node supporting V2X communications.

In one embodiment, the first receiver 1101 comprises at least one of the antenna 452, the receiver 454, the multi-antenna receiving processor 458, the receiving processor 456, the controller/processor 459, the memory 460 or the data source 467 in FIG. 4 of the present application.

In one embodiment, the first receiver 1101 comprises at least first five of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101 comprises at least first four of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101 comprises at least first three of the antenna 452, the receiver 454, the multi-antenna receiving processor 458, the receiving processor 456, the controller/processor 459, the memory 460 and the data source 467 in FIG. 4 of the present application.

In one embodiment, the first receiver 1101 comprises at least first two of the antenna 452, the receiver 454, the multi-antenna receiving processor 458, the receiving processor 456, the controller/processor 459, the memory 460 and the data source 467 in FIG. 4 of the present application.

In one embodiment, the first transmitter 1102 comprises at least one of the antenna 452, the transmitter 454, the multi-antenna transmitting processor 457, the transmitting processor 468, the controller/processor 459, the memory 460, or the data source 467 in FIG. 4 of the present application.

In one embodiment, the first transmitter 1102 comprises at least first five of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1102 comprises at least first four of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1102 comprises at least first three of the antenna 452, the transmitter 454, the multi-antenna transmitting processor 457, the transmitting processor 468, the controller/processor 459, the memory 460, and the data source 467 in FIG. 4 of the present application.

In one embodiment, the first transmitter 1102 comprises at least first two of the antenna 452, the transmitter 454, the multi-antenna transmitting processor 457, the transmitting processor 468, the controller/processor 459, the memory 460, and the data source 467 in FIG. 4 of the present application.

In one embodiment, the first receiver 1101 receives first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type among the N resource pools is a first number, the first number being a positive integer; when the first number is less than N, the first receiver 1101 receives a bit block in each resource pool of the second type among the N resource pools; the first transmitter 1102 transmits a target bit, a value of the target bit is equal to a target binary value acquired after logical And operation of N binary values; herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one embodiment, a given binary value is one of the N binary values, and the given binary value corresponds to a resource pool of the first type among the N resource pools: when the first number is equal to N, the given binary value is equal to 0; and when the first number is less than N, the given binary value is equal to 1.

In one embodiment, the first transmitter 1102 transmits M bit(s), and the target bit is one of the M bit(s); herein, the first signaling is used to indicate M0 resource pool groups, any of the M0 resource pool groups comprises at least one resource pool, and the N resource pools belong a same resource pool group among the M0 resource pool groups; the M bit(s) corresponds (respectively correspond) to M resource pool group(s) among the M0 resource pool groups;

M0 is a positive integer greater than 1, and M is a positive integer not greater than the M0.

In one embodiment, there exists one of the M0 resource pool groups comprising at least one resource pool of the second type; only when at least P resource pool groups in the M0 resource pool groups respectively comprise at least one resource pool of the second type or the first number is less than N, the target bit is transmitted; P is a positive integer greater than 1 and not greater than M0, P is a default or configurable value.

In one embodiment, a first time unit group comprises multiple time units, and each of the N resource pools comprises at least one time unit belonging to the first time unit group in time domain; the first information is used to determine a first-type time unit in the first time unit group, and a resource pool of the first type among the N resource pools is a resource pool comprising at least one first-type time unit belonging to the first time unit group.

In one embodiment, there is no time-domain overlapping among the N resource pools.

In one embodiment, the target bit is a HARQ-ACK bit, and the target bit belongs to a Type-2 HARQ-ACK codebook.

In one embodiment, the first receiver 1101 receives first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type in the N resource pools is a first number, the first number being a positive integer; when the first number is less than N, the first receiver 1101 receives a bit block in each resource pool of the second type among the N resource pools; the first transmitter 1102 transmits a target bit; when the first number is equal to N, a value of the target bit is equal to 0; when the first number is less than N, a value of the target bit indicates whether each of bit block(s) received in each of resource pool(s) of the second type among the N resource pools is correctly decoded.

In one embodiment, the first receiver 1101 receives first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type among the N resource pools is a first number, the first number being a positive integer; when the first number is less than N, the first receiver 1101 receives a bit block in each resource pool of the second type among the N resource pools; the first transmitter 1102 transmits a target bit; when the first number is equal to N, a value of the target bit is equal to 0; when the first number is less than N, a value of the target bit indicates whether each of bit block(s) received in each of resource pool(s) of the second type among the N resource pools is correctly decoded; a first time unit group comprises multiple time units, and each of the N resource pools comprises at least one time unit belonging to the first time unit group in time domain; the first information is used to determine a first-type time unit in the first time unit group, and a resource pool of the first type among the N resource pools is a resource pool comprising at least one first-type time unit belonging to the first time unit group.

In one subembodiment of the above embodiment, the time unit is a multicarrier symbol, and a resource pool of the second type among the N resource pools is a resource pool not comprising any the first-type time unit in the first time unit group.

In one subembodiment of the above embodiment, the time unit is a multicarrier symbol, the first-type time unit is a multicarrier symbol configured as UL, and a resource pool of the second type among the N resource pools is a resource pool not comprising any the first-type time unit in the first time unit group.

In one embodiment, the first receiver 1101 receives first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type in the N resource pools is a first number, the first number being a positive integer; when the first number is less than N, the first receiver 1101 receives a bit block in each resource pool of the second type among the N resource pools; the first transmitter 1102 transmits a target bit; when the first number is equal to N, a value of the target bit is equal to 0; when the first number is less than N, a value of the target bit indicates whether each of bit block(s) received in each of resource pool(s) of the second type among the N resource pools is correctly decoded; the target bit is one of M bit(s) transmitted by the first transmitter 1102; the first signaling is used to indicate M0 resource pool groups, any of the M0 resource pool groups comprises at least one resource pool, and the N resource pools belong a same resource pool group among the M0 resource pool groups; the M bit(s) corresponds (respectively correspond) to M resource pool group(s) among the M0 resource pool groups; M0 is a positive integer greater than 1, and M is a positive integer not greater than the M0; there exists one of the M0 resource pool groups comprising at least one resource pool of the second type; only when at least P resource pool groups in the M0 resource pool groups respectively comprise at least one resource pool of the second type or the first number is less than N, the target bit is transmitted; P is a positive integer greater than 1 and not greater than M0, P is a default or configurable value.

Embodiment 12

Embodiment 12 illustrates a structure block diagram of a processor in a second node, as shown in FIG. 12. In FIG. 12, a processor 1200 in a second node comprises a second transmitter 1201 and a second receiver 1202.

In one embodiment, the second node 1200 is a UE.

In one embodiment, the second node 1200 is a base station.

In one embodiment, the second node 1200 is a relay node.

In one embodiment, the second node 1200 is a vehicle-mounted communication device.

In one embodiment, the second node 1200 is a UE supporting V2X communications.

In one embodiment, the second transmitter 1201 comprises at least one of the antenna 420, the transmitter 418, the multi-antenna transmitting processor 471, the transmitting processor 416, the controller/processor 475 or the memory 476 in FIG. 4 of the present application.

In one embodiment, the second transmitter 1201 comprises at least the first five of the antenna 420, the transmitter 418, the multi-antenna transmitting processor 471, the transmitting processor 416, the controller/processor 475 and the memory 476 in FIG. 4 of the present application.

In one embodiment, the second transmitter 1201 comprises at least the first four of the antenna 420, the transmitter 418, the multi-antenna transmitting processor 471, the transmitting processor 416, the controller/processor 475 and the memory 476 in FIG. 4 of the present application.

In one embodiment, the second transmitter 1201 comprises at least the first three of the antenna 420, the transmitter 418, the multi-antenna transmitting processor 471, the transmitting processor 416, the controller/processor 475 and the memory 476 in FIG. 4 of the present application.

In one embodiment, the second transmitter 1201 comprises at least the first two of the antenna 420, the transmitter 418, the multi-antenna transmitting processor 471, the transmitting processor 416, the controller/processor 475 and the memory 476 in FIG. 4 of the present application.

In one embodiment, the second receiver 1202 comprises at least one of the antenna 420, the receiver 418, the multi-antenna receiving processor 472, the receiving processor 470, the controller/processor 475 and the memory 476 in FIG. 4 of the present application.

In one embodiment, the second receiver 1202 comprises at least first five of the antenna 420, the receiver 418, the multi-antenna receiving processor 472, the receiving processor 470, the controller/processor 475 and the memory 476 in FIG. 4 of the present application.

In one embodiment, the second receiver 1202 comprises at least first four of the antenna 420, the receiver 418, the multi-antenna receiving processor 472, the receiving processor 470, the controller/processor 475 and the memory 476 in FIG. 4 of the present application.

In one embodiment, the second receiver 1202 comprises at least first three of the antenna 420, the receiver 418, the multi-antenna receiving processor 472, the receiving processor 470, the controller/processor 475 and the memory 476 in FIG. 4 of the present application.

In one embodiment, the second receiver 1202 comprises at least first two of the antenna 420, the receiver 418, the multi-antenna receiving processor 472, the receiving processor 470, the controller/processor 475 and the memory 476 in FIG. 4 of the present application.

In one embodiment, the second transmitter 1201 transmits first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type in the N resource pools is a first number, the first number being a positive integer; when the first number is less than N, the second transmitter 1201 transmits a bit block in each resource pool of the second type in the N resource pools; the second receiver 1202 receives a target bit, a value of the target bit is equal to a target binary value acquired after logical And operation of N binary values; herein, for each of the N binary values, if the type of a corresponding resource pool among the N resource pools is the second type, the binary value indicates whether a bit block received in the resource pool is correctly decoded, and if the type of a corresponding resource pool among the N resource pools is the first type, the binary value depends on the first number.

In one embodiment, a given binary value is one of the N binary values, and the given binary value corresponds to a resource pool of the first type among the N resource pools: when the first number is equal to N, the given binary value is equal to 0; and when the first number is less than N, the given binary value is equal to 1.

In one embodiment, the second receiver 1202 receives M bit(s), and the target bit is one of the M bit(s); herein, the first signaling is used to indicate M0 resource pool groups, any of the M0 resource pool groups comprises at least one resource pool, and the N resource pools belong a same resource pool group among the M0 resource pool groups; the M bit(s) corresponds (respectively correspond) to M resource pool group(s) among the M0 resource pool groups; M0 is a positive integer greater than 1, and M is a positive integer not greater than the M0.

In one embodiment, there exists one of the M0 resource pool groups comprising at least one resource pool of the second type; only when at least P resource pool groups in the M0 resource pool groups respectively comprise at least one resource pool of the second type or the first number is less than N, the target bit is transmitted; P is a positive integer greater than 1 and not greater than M0, P is a default or configurable value.

In one embodiment, a first time unit group comprises multiple time units, and each of the N resource pools comprises at least one time unit belonging to the first time unit group in time domain; the first information is used to determine a first-type time unit in the first time unit group, and a resource pool of the first type among the N resource pools is a resource pool comprising at least one first-type time unit belonging to the first time unit group.

In one embodiment, there is no time-domain overlapping among the N resource pools.

In one embodiment, the target bit is a HARQ-ACK bit, and the target bit belongs to a Type-2 HARQ-ACK codebook.

In one embodiment, the second transmitter 1201 transmits first information and a first signaling, the first signaling is used to indicate N resource pools, N being a positive integer greater than 1, the first information is used to determine a type of at least one of the N resource pools, the type of any of the N resource pools is one of a first type and a second type, a number of resource pool(s) of the first type in the N resource pools is a first number, the first number being a positive integer; when the first number is less than N, the second transmitter 1201 transmits a bit block in each resource pool of the second type in the N resource pools; the second receiver 1202 receives a target bit; when the first number is equal to N, a value of the target bit is equal to 0; when the first number is less than N, a value of the target bit indicates whether each of bit block(s) received in each of resource pool(s) of the second type among the N resource pools is correctly decoded.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The first node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The second node in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts and other wireless communication devices. The UE or terminal in the present application includes but is not limited to mobile phones, tablet computers, notebooks, network cards, low-consumption equipment, enhanced MTC (eMTC) terminals, NB-IOT terminals, vehicle-mounted communication equipment, aircrafts, diminutive airplanes, unmanned aerial vehicles, telecontrolled aircrafts, etc. The base station or network side equipment in the present application includes but is not limited to macro-cellular base stations, micro-cellular base stations, home base stations, relay base station, eNB, gNB, Transmitter Receiver Point (TRP), GNSS, relay satellites, satellite base stations, space base stations, test device, test equipment, test instrument and other radio communication equipment.

It will be appreciated by those skilled in the art that this disclosure can be implemented in other designated forms without departing from the core features or fundamental characters thereof. The currently disclosed embodiments, in any case, are therefore to be regarded only in an illustrative, rather than a restrictive sense. The scope of invention shall be determined by the claims attached, rather than according to previous descriptions, and all changes made with equivalent meaning are intended to be included therein.

What is claimed is:

1. A user equipment (UE) for wireless communications, the UE comprising:
   a transceiver; and
   a processor, wherein the transceiver and the processor are configured to:
   receive an indication of a plurality of resource pools, receive a pool type information indicative of a type of the plurality of resource pools, on a condition that the plurality of resource pools includes one or more first type of resource pools and one or more second type of resource pools, receive one or more bit block in the one or more second type of resource pools,
   determine a plurality of binary values corresponding to the plurality of resource pools, wherein one or more binary values corresponding to the one or more second type of resource pools indicates whether a bit block received in corresponding second type of resource pool is correctly decoded, and wherein one or more binary values corresponding to the one or more first type of resource pools is based on a number of the one or more first type of resource pools, and
   transmit a target bit equal to a target binary value obtained by logical AND operation of the plurality of binary values.

2. The UE according to claim 1, wherein a given binary value is one of the plurality of binary values, and the given binary value corresponds to a resource pool of the one or more first type of resource pools, and wherein:
   on a condition that the plurality of resource pools does not include any second type of resource pools, the given binary value is equal to 0, and
   on a condition that the plurality of resource pools includes at least one second type of resource pool, the given binary value is equal to 1.

3. The UE according to claim 2, wherein the transceiver and the processor are further configured to:
   receive an indication of a plurality of resource pool groups, and transmit one or more bits corresponding to one or more resource pool groups of the plurality of resource pool groups.

4. The UE according to claim 1, wherein the meaning of the value of the target bit equal to the target binary value obtained by logical AND operation of the plurality of binary values comprises:

on a condition that the plurality of resource pools does not include any second type of resource pools, the value of the target bit is equal to 0, and on a condition that the plurality of resource pools includes at least one second type of resource pool, the value of the target bit indicates whether each bit block s received in each of the one or more second type of resource pools is correctly decoded.

5. The UE according to claim 2, wherein a first time unit group comprises multiple time units, and each of the plurality of resource pools comprises at least one time unit belonging to the first time unit group in time domain, and wherein the pool type information is used to determine a first-type time unit in the first time unit group, and a first type of resource pool of the plurality of resource pools comprises at least one first-type time unit belonging to the first time unit group.

6. The UE according to claim 5, wherein the first-type time unit is a time unit configured as Uplink (UL).

7. The UE according to claim 2, wherein the target bit is a Hybrid Automatic Repeat reQuest ACKnowledgement (HARQ-ACK) bit, and the target bit belongs to a Type-2 HARQ-ACK codebook.

8. A base station for wireless communications, the base station comprising:

a transceiver; and a processor, wherein the transceiver and the processor are configured to:

transmit a first signaling indicative of a plurality of resource pools, transmit first information indicative of a type of the plurality of resource pools, on a condition that the plurality of resource pools includes one or more first type of resource pools and one or more second type of resource pools, transmit one or more bit block in the one or more second type of resource pools, and receive a target bit, wherein a value of the target bit is equal to a target binary value acquired after logical AND operation of a plurality of binary values, wherein one or more binary values corresponding to the one or more second type of resource pools indicates whether a bit block received in corresponding second type of resource pool is correctly decoded, and wherein one or more binary values corresponding to the one or more first type of resource pools is based on a number of the one or more first type of resource pools.

9. The base station according to claim 8, wherein a given binary value is one of the plurality of binary values, and the given binary value corresponds to a resource pool of the one or more first type of resource pools, and wherein:

on a condition that the plurality of resource pools does not include any second type of resource pools, N, the given binary value is equal to 0, and on a condition that the plurality of resource pools includes at least one second type of resource pool, the given binary value is equal to 1.

10. The base station according to claim 9, wherein the transceiver and the processor are further configured to:

receive one or more bit s including the target bit, and wherein the first signaling is indicative of a plurality of resource pool groups, and wherein the one or more bit s correspond to one or more resource pool groups of the plurality of resource pool groups.

11. The base station according to claim 9, wherein a first time unit group comprises multiple time units, and each of the plurality of resource pools comprises at least one time unit belonging to the first time unit group in time domain, and wherein the first information is used to determine a first-type time unit in the first time unit group, and first type of resource pool of the plurality of resource pools comprises at least one first-type time unit belonging to the first time unit group.

12. The base station according to claim 11, wherein the first-type time unit is a time unit configured as UL.

13. The base station according to claim 9, wherein the target bit is a HARQ-ACK bit, and the target bit belongs to a Type-2 HARQ-ACK codebook.

14. A method in a user equipment (UE) for wireless communications, the method comprising:

receiving an indication of a plurality of resource pools;

receiving a pool type information indicative of a type of the plurality of resource pools;

on a condition that the plurality of resource pools includes one or more first type of resource pools and one or more second type of resource pools, receiving one or more bit block in the one or more second type of resource pools;

determining a plurality of binary values corresponding to the plurality of resource pools, wherein one or more binary values corresponding to the one or more second type of resource pools indicates whether a bit block received in corresponding second type of resource pool is correctly decoded, and wherein one or more binary values corresponding to the one or more first type of resource pools is based on a number of the one or more first type of resource pools; and transmitting a target bit equal to a target binary value obtained by logical AND operation of the plurality of binary values.

15. The method in the UE according to claim 14, wherein a given binary value is one of the plurality of binary values, and the given binary value corresponds to a resource pool of the one or more first type of resource pools, and wherein:

on a condition that the plurality of resource pools does not include any second type of resource pools, the given binary value is equal to 0, and on a condition that the plurality of resource pools includes at least one second type of resource pool, the given binary value is equal to 1.

16. The method in the UE according to claim 15, further comprising:

receiving an indication of a plurality of resource pool groups; and transmitting one or more bit s corresponding to one or more resource pool group s of the plurality of resource pool groups.

17. The method in the UE according to claim 14, wherein the meaning of the value of the target bit equal to the target binary value obtained by logical AND operation of the plurality of binary values comprises:

on a condition that the plurality of resource pools does not include any second type of resource pools, the value of the target bit is equal to 0; and on a condition that the plurality of resource pools includes at least one second type of resource pool, the value of the target bit indicates whether each bit block s received in each of the one or more second type of resource pools is correctly decoded.

18. The method in the UE according to claim 15, wherein a first time unit group comprises multiple time units, and each of the plurality of resource pools comprises at least one time unit belonging to the first time unit group in time domain, and wherein the pool type information is used to determine a first-type time unit in the first time unit group, and a first type of resource pool of the plurality of resource pools comprises at least one first-type time unit belonging to the first time unit group.

19. The method in the UE according to claim 18, wherein the first-type time unit is a time unit configured as UL.

20. The method in the UE according to claim 15, wherein the target bit is a HARQ-ACK bit, and the target bit belongs to a Type-2 HARQ-ACK codebook.

\* \* \* \* \*